UNITED STATES PATENT OFFICE.

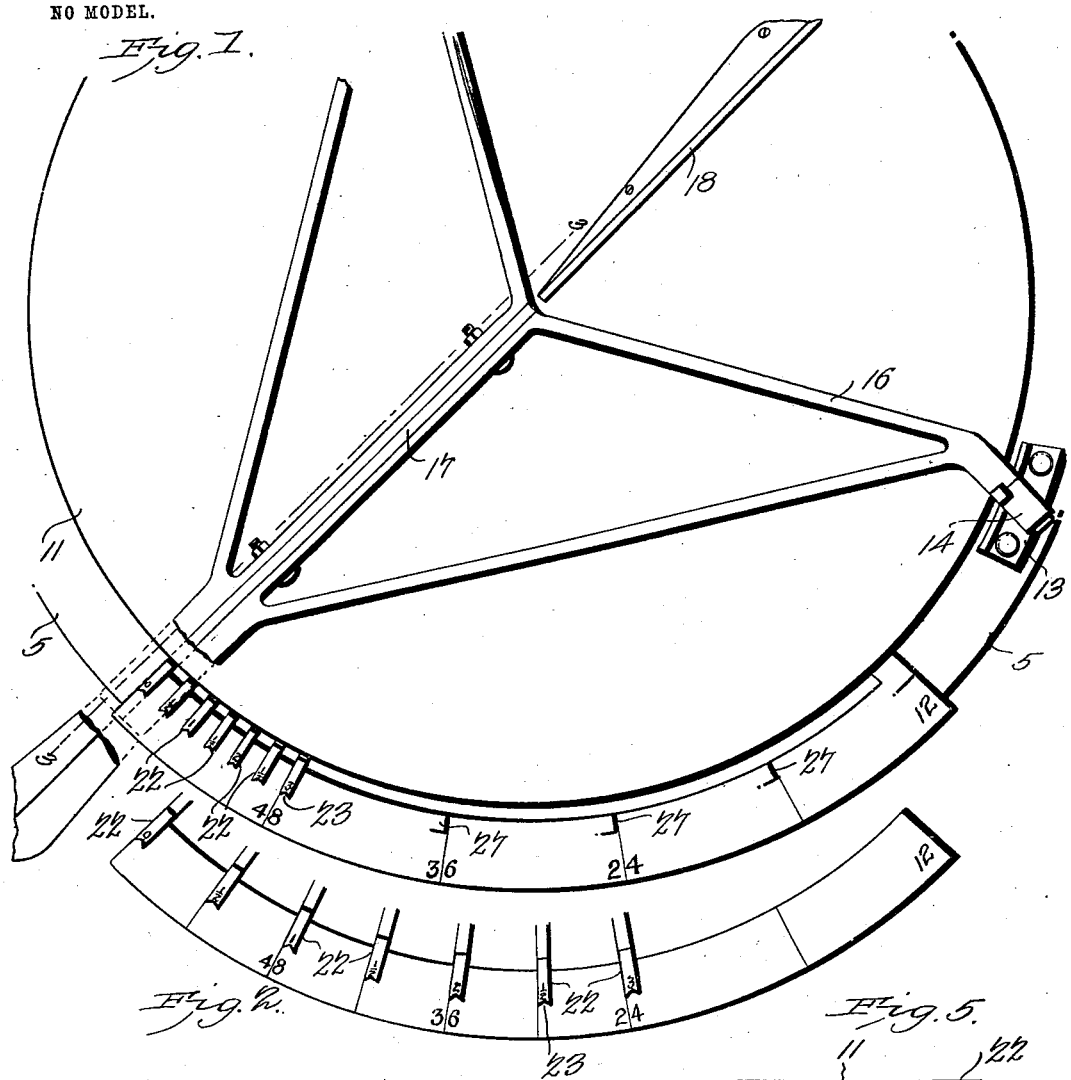
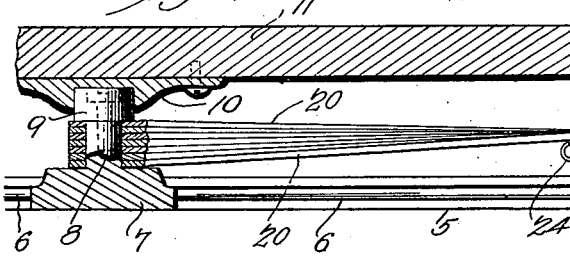
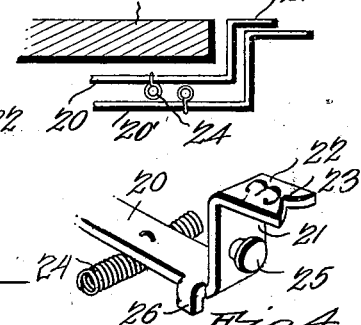

WILLIAM G. TEMPLETON, OF COLORADO SPRINGS, COLORADO.

ADJUSTABLE GAGE.

SPECIFICATION forming part of Letters Patent No. 725,891, dated April 21, 1903.

Application filed November 26, 1901. Serial No. 83,781. (No model.)

*To all whom it may concern:*

Be it known that I, WILLIAM G. TEMPLETON, a citizen of the United States, residing at Colorado Springs, in the county of El Paso and State of Colorado, have invented a new and useful Adjustable Gage, of which the following is a specification.

My invention relates to certain improvements in gages or measuring devices, and has for its principal object to provide an improved form of adjustable gage which may be adjusted to any desired total or fraction thereof representing weight, measure, or value and when so adjusted will equally divide such total into any predetermined number of fractional parts.

My present invention is designed more especially for use as a gage for measuring fractional parts of the weight of cheese and similar articles, so that a known weight may be accurately cut; but it will be understood that the invention may be applied to the measurement or division of any total value, weight, or measure, the application herein shown and described representing only one form of its use and being employed to more clearly illustrate the invention.

In the accompanying drawings, Figure 1 is a a plan view of a portion of a cheese-cutting machine, illustrating an adjustable gage constructed and arranged in accordance with my invention. Fig. 2 is a detail plan view of a portion of the same drawn to a somewhat larger scale. Fig. 3 is a transverse sectional elevation of the device on the line 3 3 of Fig. 1. Fig. 4 is a detail perspective view of one of the indicating-arms. Fig. 5 is a sectional elevation of a portion of the cutting-machine, illustrating the application of a double indicator to represent both weight and rate.

Similar numerals of reference are employed to designate corresponding parts throughout the several figures of the drawings.

5 designates a suitable base-ring having a series of radial arms 6, extending from a centrally-disposed hub 7, from which extends a pivot-pin 8, in the upper end of which is secured a cylindrical block 9, forming a bearing for a socket member 10. To the socket member is secured a disk or cutting-board 11.

At suitable points on the base-ring 5 are standards 13, provided at their upper ends with sockets 14 for the reception of the pintles of a knife-carrying frame 16, to which is secured a suitable cutting-knife 17. The disk or board is preferably provided with a follower 18, which is placed against the cut surface of the cheese to protect the same from the atmosphere and at the same time to assist in transmitting the rotative movement of the disk to the cheese.

In cheese-cutting machines as ordinarily constructed it is usual to employ a gage for measuring the weight of a sector of cheese to be cut, such gages, as a rule, extending around one-quarter of the circumference of the disk or cutting-board, and a number of gages being employed in order that cheese of different weights may be accurately measured.

In carrying out my invention I employ a gage which may be adjusted in accordance with the weight of the cheese to be cut, the operation of adjusting causing the movement of any suitable number of indicating-hands to equally divide such total into fractional parts of the whole, the base-ring or a suitable scale-bar thereon being provided with indicating-marks or the like representing the total weight of the cheese.

On the pivot-pin 8 are swiveled a number of indicating-arms 20, each formed of a thin flat strip of suitable metal, the outer end of which extends beyond the circumferential line of the disk 11 and is thence bent upwardly to the level of the upper surface of the disk and thence outwardly in a plane parallel with the plane of the main body of the indicating-arm, as illustrated more clearly in Fig. 4, and forming a small tag-like surface 22, adapted to receive a number or numbers representing either weight or value. The outer edge of the portion 22 is preferably provided with a centrally-disposed indentation 23, which forms the indicating-mark or guide for the knife.

Extending under the series of arms is a helical tension-spring 24, one end of which is secured, together with the indicating-arm representing the zero-point, to the fixed frame of the machine, and the opposite end of said spring is secured to the last of the arms. At equidistant points throughout the length of the spring are secured the various indicating-arms, care being taken that there be an equal number of turns of the spring-coil between the points of attachment to the different arms. The outer arm of the series is provided with a knob or handle 25 and with a suitable catch 26, so that the gage may be stretched against the action of the spring to any desired point corresponding with the weight of the cheese to be cut and there held by the engagement of the catch 26 with a suitable holding-tooth 27, formed on the upper face of the base-ring or upon an auxiliary scale-bar carried thereby. As a matter of illustration I have in the drawings illustrated four holding-teeth designated, respectively, with the numerals 48, 36, 24, and 12 and representing different weights of cheese which may be cut. The position and arrangement of the teeth may be changed, and any additional number of teeth may be added to represent different weights.

The gage, as herein illustrated, is provided with a number of arms indicating pounds and fractions thereof, the last arm being numbered 3 and representing the capacity of the scale, although it will be understood that any desired number of arms may be used and the capacity of the gage increased or diminished to any desired extent. As the present gage is extensible for a distance equal to one-quarter of the circumference of the cutting-board, it follows that when a cheese weighing twelve pounds is placed in position and the indicator is stretched until the catch 26 is in engagement with the holding-tooth designated by the number 12 one-quarter of the cheese, weighing three pounds, will be divided off by the remaining arms into pounds and fractions thereof, any one of which may be turned into alinement with the cutting-point and a section of cheese of the desired weight be properly measured. If a forty-eight-pound cheese is to be cut, the outer arm of the indicator is brought into alinement with the holding-tooth designated by the number 48, and the smaller space thus marked off is subdivided by the remaining arms to properly designate the weight of a sector of a given size. The arms may be adjusted to any desired distance and any suitable designating-marks be employed to represent the total weight of a cheese or any other article or any total value or measure which it may be desired to divide into equal portions, and in lieu of the helical spring any other suitable elastic or extensible medium may be employed for the purpose of connecting the arms.

In some cases it may be desirable to employ, in addition to the scale representing weights and fractional parts thereof, a rate-scale indicating, for instance, the price in pounds or indicating the quantity which may be sold at a certain price. To this end I may employ, in addition to the indicating-arms 20, a second set of indicating-arms 20', arranged and connected in similar manner and bearing any designating-marks suitable for the purpose.

While the construction herein illustrated and described presents the preferred form of the device, it is obvious that many changes in the form, proportion, size, and minor details of the structure may be made within the scope of the claims without departing from my invention.

Having thus described my invention, what I claim is—

1. A device for measuring subdivisions of an article having a known weight, comprising a series of arms having superposed inner ends and arranged on a common fulcrum, the outer ends of said arms having their upper faces in the same horizontal plane and each bearing a designating-mark, and an extensible member connected at equidistant points to said arms and normally tending to draw the same together, substantially as specified.

2. A device for supporting and measuring subdivisions of an article having a known weight, comprising a revoluble disk, a series of indicating-arms pivoted on a line coincident with the center of rotation of said disk and having their outer ends projecting beyond the periphery thereof, and an extensible member connected at equidistant points to said arms.

3. The combination with a gage comprising a series of arms having a common fulcrum and each bearing designating-marks, of an extensible member connected to said arms and independent of the supporting-fulcrum, an auxiliary scale having data designating certain total values, and means for securing said gage in position on the auxiliary scale to subdivide any one of said totals.

4. The combination with a gage comprising a series of arms bearing designating-marks, a holding-catch carried by the outer of said arms, an extensible member connected at equidistant points to said arms, and an auxiliary scale bearing designating-marks representing certain total values, and teeth arranged at each of said total-designating marks for engagement with said holding-catch.

5. In combination, a base-ring bearing a scale representing certain total values, a revoluble disk, a plurality of indicating-arms pivoted on a line coincident with the center of rotation of said disk, said arms extending outwardly beyond the periphery of the disk to a point over the total-value scale, an extensible member secured at equidistant points to said arms, a holding-catch carried by the outer of the arms, and teeth arranged adjacent to the designating-marks of the total-scale for engaging and holding said catch.

6. The combination with a revoluble disk, a series of indicating-arms pivoted on the line coincident with the center of rotation of said disk, each of said arms being bent upwardly and outwardly at the circumferential line of the disk, and an extensible member to which each of said arms is connected.

In testimony that I claim the foregoing as my own I have hereto affixed my signature in the presence of two witnesses.

WILLIAM G. TEMPLETON.

Witnesses:
JNO. E. PARKER,
J. H. JOCHUM, Jr.